(12) United States Patent
Wang et al.

(10) Patent No.: US 11,084,899 B2
(45) Date of Patent: Aug. 10, 2021

(54) REACTIVE PROCESSING OF POLYARYLETHERKETONES

(71) Applicant: Polymics, Ltd., State College, PA (US)

(72) Inventors: Yi-Feng Wang, State College, PA (US);
Tim Hsu, State College, PA (US);
Dustin Veazey, State College, PA (US)

(73) Assignee: POLYMICS, LTD., State College, PA (US)

( * ) Notice: Subject to any disclaimer, the term of this patent is extended or adjusted under 35 U.S.C. 154(b) by 0 days.

(21) Appl. No.: 16/131,134

(22) Filed: Sep. 14, 2018

(65) Prior Publication Data
US 2020/0087448 A1   Mar. 19, 2020

(51) Int. Cl.
*C08G 61/12* (2006.01)
*C08G 85/00* (2006.01)

(52) U.S. Cl.
CPC ......... *C08G 61/127* (2013.01); *C08G 85/002* (2013.01); *C08G 2261/3442* (2013.01); *C08G 2261/45* (2013.01); *C08G 2261/592* (2013.01)

(58) Field of Classification Search
CPC ....... C08G 61/127; C08G 61/12; C08L 65/00; C08L 2666/02
See application file for complete search history.

(56) References Cited

U.S. PATENT DOCUMENTS

| | | | | |
|---|---|---|---|---|
| 3,516,966 A | * | 6/1970 | Berr | C08G 61/127 528/194 |
| 3,637,592 A | * | 1/1972 | Berr | C08G 61/127 528/194 |
| 3,767,620 A | * | 10/1973 | Angelo et al. | C08G 61/127 525/419 |

* cited by examiner

*Primary Examiner* — Shane Fang
(74) *Attorney, Agent, or Firm* — Morgan, Lewis & Bockius LLP

(57) ABSTRACT

Melt stable polyaryletherketoneketone are prepared from a reactive, lower molecular weight polyaryletherketoneketone having an ultraviolet absorbance at 455 nm of at least 0.185 when measured in 0.1% solution in dichloroacetic acid.

7 Claims, 3 Drawing Sheets

REACTIVE PROCESSING OF POLYARYLETHERKETONES

TECHNICAL FIELD

The present disclosure relates to increasing the molecular weight of polyaryletherketones (PAEK) via high temperature reactive melt process such as compounding, extrusion, injection molding, compression molding, and coating.

BACKGROUND

Polyaryletherketones are a family of high performance polyketones that include polyether ether ketone (PEEK), polyaryletherketoneketone (PEKK), polyarylether ether ketone ketone (PEEKK) and variations thereof. Polyaryletherketoneketone (PEKK) is a family of high performance thermoplastic aromatic polyketone copolymers. PEKK, as a family of copolymers, are typically semi-crystalline in nature with high glass transition temperatures and high melting temperatures. These copolymers are increasingly used as critical components in aerospace, oil and gas exploration, automotive, electric and electronics due to their excellent chemical resistance, high temperature resistance, good mechanical properties, and flame resistance.

PEKK polymers are typically produced via a polycondensation reaction between acid halides and unhindered diphenylethers with anhydrous aluminum trichloride, e.g., an electrophilic route. One of the problems associated with making such polymers by the electrophilic route, is that unless the reaction is carried out in strongly acidic solvent systems such as $HF/BF_3$ or fluorinated sulfonic acids, the semi-crystalline nature of the polymers cause them to precipitate from conventional organic solvents before they can achieve a high molecular weight.

Another factor that may lead to poor results with making such polymers by the electrophilic route is deactivation of the terminal aryloxy groups by complexation with aluminum chloride or alkylation of the terminal group which prevents further growth of the polymer chain. In addition, side reactions, particularly at ortho positions of activated aromatic rings can result in polymers that are branched or are more likely to cross-link at elevated temperatures.

References which disclose low molecular weight PEKK polymers and problems with their production include, for example, U.S. Pat. No. 3,065,205 which discloses preparing polyaryletherketoneketone polymers with an inherent viscosity of less than 0.20 dL/g from diphenylether and isophthaloyl chloride, or diphenylether and terephthaloyl chloride with aluminum chloride as a catalyst. U.S. Pat. No. 3,767,620 discloses preparing polyaryletherketoneketone polymers from diphenyl ether and a mixture of isophthaloyl chloride and terephthaloyl chloride with aluminum chloride as a catalyst with a low percentage of 9-phenylenexanthydrol end groups to exhibit an ultraviolet absorbance at 4550 angstrom units of less than about 0.18. The reference discloses that the 9-phenylenexanthydrol end-groups were found to be a major factor in the poor melt stability of this type of polyketone, and the polymer, having ultraviolet absorbance greater than 0.25 at 4450 angstrom, degrades when heated to extrusion temperature. The reference discloses a process to avoid the undesirable end group. WO2018055384 also discloses a process to prepare polyaryl ether ketones with low levels of 9-phenylenexanthydrol.

To minimize side reaction, U.S. Pat. No. 4,709,007 disclosed a method of forming thermally stable polyaryletherketoneketone from diphenylether and a mixture of terephthaloyl chloride and isophthaloyl chloride using a Lewis base such as trimethylamine hydrochloride. However, the inherent viscosity of the resulting polymer is <0.8 dL/g. To avoid side reaction and formation of melt stable high molecular weight polyaryletherketoneketone, U.S. Pat. No. 4,816,556 disclosed a two-step process to produce polyaryletherketoneketone polymers by formation of 1,4-bis(4-phenoxybenzoyl)benzene from terephthaloyl chloride and large excess amount of diphenylether, isolate and purify the 1,4-bis(4-phenoxybenzoyl)benzene, followed by reaction of the oligomers with isophthaloyl chloride or a mixture of isophthaloyl chloride and terephthaloyl chloride.

Hence, a continuing need exists for preparing polyaryletheretherketone polymers with high molecular weight that are melt stable.

SUMMARY OF THE DISCLOSURE

An advantage of the present disclosure is a reactive polyaryletherketoneketone having a certain ultraviolet absorbance value and polymers prepared therefrom. Such reactive polymers advantageously can be used to prepare a high molecular weight and melt stable polyaryletherketoneketone by heating the reactive polymer.

These and other advantages are satisfied, at least in part, by a reactive polyaryletherketoneketone, which comprises: (i) an ultraviolet (UV) absorbance at 455 nm, measured in 0.1% solution in dichloroacetic acid, of at least, if not greater than 0.185; and (ii) a relatively low inherent viscosity. In certain various embodiments of the present disclosure, the reactive polyaryletherketoneketone has a UV absorbance of less than 0.600, such as less than 0.500. In other embodiments, the reactive polyaryletherketoneketone has a low inherent viscosity of 0.35 dL/g, as measured in 0.5% solution in concentrated sulfuric acid at 30° C. In still further embodiments, the reactive polyaryletherketoneketone can be prepared from a diphenylether and a mixture of a terephthaloyl halide and an isophthaloyl halide monomers with a catalyst, such as a Friedel-Craft catalyst.

Another aspect of the present disclosure includes a process for preparing a melt stable polyaryletherketoneketone. The process comprises heating a reactive polyaryletherketoneketone to form the melt stable polyaryletherketoneketone. The reactive polyaryletherketoneketone can have an inherent viscosity of at least 0.35 dL/g, as measured in 0.5% solution in concentrated sulfuric acid at 30° C., and have an UV absorbance at 455 nm at least 0.185, measured in 0.1% solution in dichloroacetic acid. The process can include heating a reactive polyaryletherketoneketone such as by melt extruding the reactive polyaryletherketoneketone to form the melt stable polyaryletherketoneketone. Advantageously, the inherent viscosity of the melt stable polyaryletherketoneketone is at least 10% greater than the reactive polyaryletherketoneketone. The reactive polyaryletherketoneketone can be prepared from a mixture of a diphenylether, a terephthaloyl halide and an isophthaloyl halide and a catalyst, such as a Friedel-Crafts catalyst.

Yet another aspect of the present disclosure includes a melt stable polyaryletherketoneketone prepared from a reactive polyaryletherketoneketone. Such a melt stable polyaryletherketoneketone has a unique molecular architecture due to the linking of the reactive polymer. In some aspects of the present disclosure, the reactive polyaryletherketoneketone has an ultraviolet (UV) absorbance at 455 nm, when measured in 0.1% solution in dichloroacetic acid, of greater than 0.185, such as at least 0.2. In other embodiments, the melt stable polyaryletherketoneketone has an inherent viscosity of at least 0.8 dL/g, as measured in 0.5% solution in concentrated sulfuric acid at 30° C. and in still further embodiments, the melt stable polyaryletherketoneketone has an ultraviolet (UV) absorbance at 455 nm when measured in 0.1% solution in dichloroacetic acid, of less than 0.185, such as less than 0.17.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Figure 1:
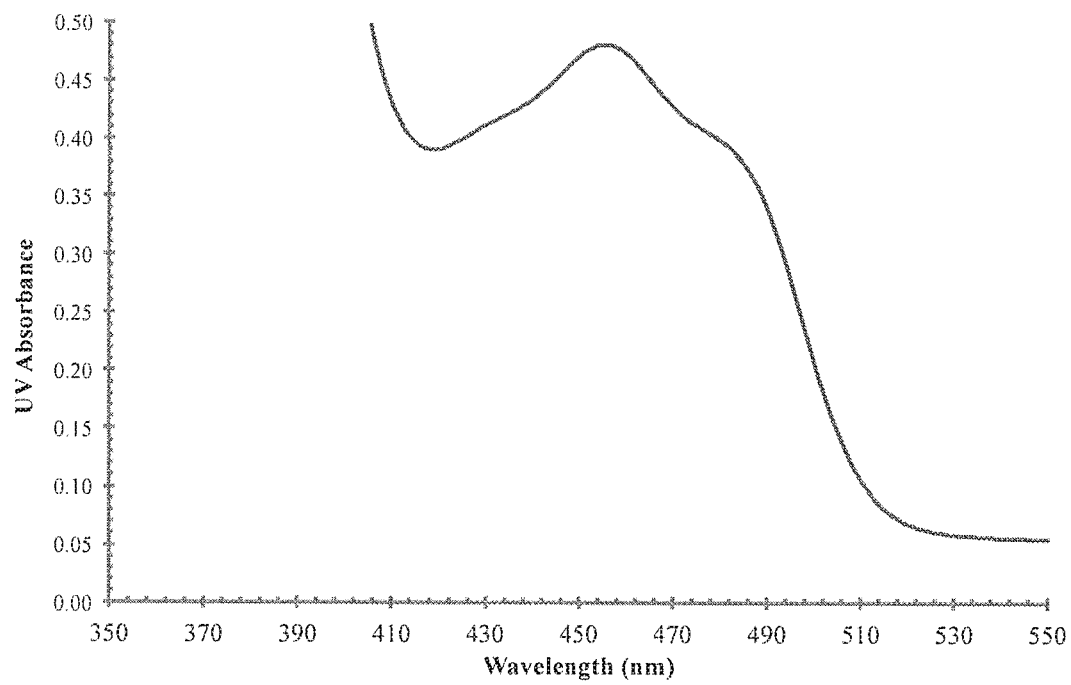
FIG. 1 is a UV Spectrum of reactive polyaryletherketoneketone of Example 1 in 0.1% solution in dichloroacetic acid.

Polyaryletherketone polymers are a family of semi-crystalline thermoplastic polymers whose molecular backbone contains aryl ketones and aryl ethers. A general formula for a PAEK is provided below:

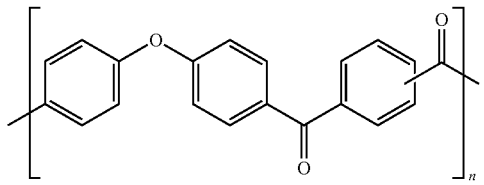

wherein n is the number of repeating units and can range from 10 to about 500 or higher.

It has now been found that polyaryletherketoneketone polymers (PAEKs) can be prepared in relatively high molecular weight by a high temperature reactive melt process when using a reactive, lower molecular weight initial PAEK. PAEKs in general, and PEKKs, in particular, can be melt processed with a wide range of polymer processing techniques at temperatures above their melting temperature, e.g., above about 300° C. Preferably, the polymers are melt processed below their degradation temperature, e.g., below about 480° C. Hence, the polymers can be melt processed at temperatures above about 300° C. and below about 480° C., e.g., between about 300° C. to about 450° C., or between about 340° C. to about 420° C., or between about 360° C. to about 400° C. or ranges therebetween. A high temperature reactive melt process can include compounding, extrusion, injection molding, compression molding, and coating, for example.

In an aspect of the present disclosure, a high molecular weight, melt stable polyaryletherketoneketone can be prepared from a lower molecular weight, reactive polyaryletherketoneketone (also referred to herein as a "reactive polyaryletherketoneketone") by heating the reactive polyaryletherketoneketone with mixing or without mixing to form a high molecular weight, melt stable polyaryletherketoneketone, e.g. a polyaryletherketoneketone that does not undergo changes in molecular weight upon melting as determined by changes in viscosity, for example. Such a melt stable polyaryletherketoneketone can be prepared, for example, from a reactive polyaryletherketoneketone having an ultraviolet (UV) absorbance at 455 nm of at least 0.185, measured in 0.1% solution in dichloroacetic acid, by heating the reactive precursor to a temperature above its melting temperature, e.g., above about 300° C., with mixing such as through an extruder or other similar device which applies heat and mixes the polymer, or without mixing such as powder coating.

It is believed that the UV absorbance at 455 nm of the polyaryletherketoneketone reflects a quantity of 9-phenylenexanthydrol functional groups on the reactive polyaryletherketoneketone. These groups can be located on the ends of the reactive polymer or at other locations. While others have avoided polyaryletherketoneketone polymers including a high quantity of 9-phenylenexanthydrol functional-groups because such groups are implicated in poor melt stability of PAEK polymers, we have surprisingly found that PAEK polymers having a sufficient number of such groups, as determined by UV absorbance, advantageously allows a low molecular weight, reactive PAEK polymer to undergo an increase in molecular weight through reactive melt processing to a higher molecular weight polymer that is melt stable.

Thus, a melt stable polyaryletherketoneketone prepared from a reactive polyaryletherketoneketone of the present disclosure has a unique molecular architecture in that the melt stable polyaryletherketoneketone comprises one or more links formed from a reaction of the 9-phenylenexanthydrol functional groups on the reactive polyaryletherketoneketone. After heating the reactive polyaryletherketoneketone, the resulting polyaryletherketoneketone exhibits a higher molecular weight compared to the reactive polyaryletherketoneketone precursor. The resulting polyaryletherketoneketone further does not readily undergo further reaction such that repeated melting of the formed polyaryletherketoneketone does not result in a significant change in its viscosity showing that the melt stable polyaryletherketoneketone prepared from a reactive polyaryletherketoneketone of the present disclosure has a lower quantity or no quantity of 9-phenylenexanthydrol functional groups.

Advantageously, the reactive polyaryletherketoneketone has a relatively low molecular weight, which facilitates use of such a reactive polyaryletherketoneketone in processing and coating. In aspects of the present disclosure, the initial polyaryletherketoneketone has a low inherent viscosity, as measured in 0.5% solution in concentrated sulfuric acid at 30° C., of no higher than about 1.20 dL/g, such as no higher than about 1.0, 0.90, 0.80, 0.60, 0.50, 0.40, 0.30, 0.25 dL/g and valves therebetween. In an embodiment, the reactive polyaryletherketoneketone has an inherent viscosity, as measured in 0.5% solution in concentrated sulfuric acid at 30° C., of at least 0.35 dL/g. In other embodiments, the reactive polyaryletherketoneketone has an inherent viscosity of at least 0.35 dL/g and no higher than about 1.20 dL/g, such as no higher than about 1.0, 0.90, 0.80, 0.60, 0.50, 0.40, 0.30, 0.25 dL/g and valves therebetween.

In practicing aspects of the present disclosure, heating the reactive polyaryletherketoneketone forms the melt stable polyaryletherketoneketone. The melt stable polyaryletherketoneketone thus formed can have a higher inherent viscosity compared to the inherent viscosity of the reactive polymer. Such an increase can be at least about 10% and preferable the inherent viscosity of the formed, melt stable polyaryletherketoneketone is increased by at least 15%, 20%, 30%, 40%, 50%, 60%, 70% or higher compared to the reactive polyaryletherketoneketone. It is believed that the increase in the inherent viscosity of the melt stable PAEK polymer after reactive melt processing is due a reaction of 9-phenylenexanthydrol functional groups, such as a chain extension reaction, on the reactive polymer. Advantageously, the processes of the present disclosure can form stable higher molecular weight PAEK polymers via reactive melt processing without cross-linking reaction such that the resulting polymers can be fully soluble in concentrated sulfuric acid.

The lower molecular weight, reactive polyaryletherketoneketone can be prepared from a diphenylether, and a mixture of acid halide monomers such as a mixture of a terephthaloyl halide and an isophthaloyl halide. Such a mixture of acid halide monomers can include a terephthaloyl chloride and an isophthaloyl chloride. In one aspect of the present disclosure, a ratio of terephthaloyl halide and isophthaloyl halide (e.g., a ratio of terephthaloyl chloride and isophthaloyl chloride) is from 90/10 to 10/90 and can include a ratio of from 80/20 to 40/60 and 75/25 to 45/55.

The monomers can also be subjected to a catalyst such as a Friedel-Crafts catalyst, e.g., a catalyst comprising an aluminum, antimony, or ferric halide such as aluminum chloride, antimony pentachloride or ferric chloride. Other Friedel-Crafts catalysts, such as aluminum bromide, boron trifluoride, zinc chloride, antimony trichloride, ferric bromide and stannic chloride, can also be used.

In an aspect of the present disclosure, the reactive polyaryletherketoneketone has an UV absorbance at 455 nm of at least 0.185, as measured in 0.1% solution in dichloroacetic acid. As observed in the experiments below, an UV absorption of at least 0.185 tends to increase the inherent viscosity of a reactive PAEK polymer whereas a UV absorption below 0.185 did not. Hence, in some embodiments of the present disclosure, the reactive polyaryletherketoneketone has an UV absorbance at 455 nm, as measured in 0.1% solution in dichloroacetic acid, of greater than 0.185, such as at least 0.20 or at least 0.25, 0.30, 0.35, 0.40, 0.500 or higher and values therebetween. It was also observed that if the UV value was too high, the reactive polyaryletherketoneketone tends to undergo crosslinking reactions thereby adversely affecting the solubility of the heat formed polymer. Hence, if crosslinking is to be minimized, the reactive polyaryletherketoneketone preferably has an UV absorbance at 455 nm, measured in 0.1% solution in dichloroacetic acid, of less than about 0.700, e.g., less than about 0.600 or even less than 0.490. w In an aspect of the present disclosure, the lower molecular weight, reactive polyaryletherketoneketone can be prepared generally by electrophilic displacement and polycondensation reaction of acid halide aryl monomers and a diphenylether in presence of a Lewis acid and a Lewis base. The reactive polyaryletherketoneketone can be prepared generally by combining a Friedel-Crafts catalyst with a diphenyl ether in a solvent under an inert atmosphere followed by addition of a mixture of acid halide aryl monomers, such as a mixture of a terephthaloyl chloride and isophthaloyl chloride. The ingredients can be mixed and heated until the polycondensation reaction is more or less complete followed by separating the prepared reactive polyaryletherketoneketone from the reaction mixture such as by precipitation of the reactive polymer in a non-solvent and filtering the precipitated reactive polymer. The separated reactive polymer can be purified by washing with water, alcohols, and/or acids such as HCl, and then dried and then analyzed to determine its inherent viscosity and UV absorbance. If the UV absorbance of the reactive polyaryletherketoneketone is too high, e.g., greater than about 0.60 for example to minimize potential crosslinking, the UV absorbance can be reduced by mixing the reactive polymer with formic acid or a solution thereof.

As a general example, the reactive polyaryletherketoneketone can be prepared according to the following procedure: A glass-lined reactor with jacketed cooling is equipped with a mechanical stirrer, nitrogen inlet, glycol coolant, and a condenser. An appropriate amount of anhydrous dichloromethane is charged and cooled to less than about −10° C. Appropriate amount of anhydrous aluminum trichloride is added under nitrogen atmosphere, followed by addition of an appropriate amount of anhydrous Lewis base such as lithium chloride. After addition of a Lewis base, the reaction mixture is cooled to less than about −10° C., and an appropriate amount of anhydrous diphenyl ether is then added. Then an appropriate amount of a mixture of terephthaloyl chloride and isophthaloyl chloride is slowly added to the reaction mixture at temperature of less than about −10° C. After addition of the mixture of terephthaloyl chloride and isophthaloyl chloride, the reaction mixture is kept at about −10 to −5° C. for about 1 to 5 hours. The reaction temperature is then raised to about 15 to 35° C., and kept at about 15-35° C. for about 8 to 36 hours. At the end of reaction, the reaction mixture can be discharged into a closed mixing tank filled with an appropriate amount of de-ionized water to precipitate the formed initial polyaryletherketoneketone as a white solid polymer. Upon filtration, the white solid polymer can be further purified by washing with diluted hydrochloric acid, de-ionized water and methanol. The resulting white polymer is then dried at about 120 to 200° C. over about 4 to 24 hours. The dried polymer is then analyzed to determine its inherent viscosity as measured in 0.5% solution in concentrated sulfuric acid at 30° C., and UV absorbance at 455 nm, measured in 0.1% solution in dichloroacetic acid. The UV absorbance of the polymer at 455 nm polymer can be reduced by mixing the polymer with formic acid or solution thereof such as a solution in water or lower ketone, e.g., acetone, or lower alcohol (about 60 to 100%) at a temperature from about 60 to 120° C. over a period of about 30 minutes to 8 hours.

In accordance with aspects of the present disclosure, a melt stable polyaryletherketoneketone can be prepared by a high temperature reactive melt process from a reactive, lower molecular weight polyaryletherketoneketone. The reactive polyaryletherketoneketone can be subjected to high temperature and mixing such as in an extruder or similar device to form the melt stable polyaryletherketoneketone. In certain embodiments, the melt processed polymer is fully soluble in concentrated sulfuric acid and has an increased molecular weight as measured by an inherent viscosity of at least 0.8 dL/g, or at least 0.90 dL/g, such as at least 1.0 dL/g, 1.1 dL/g, 1.2 dL/g or higher when measured in 0.5% solution in concentrated sulfuric acid at 30° C. Further, the melt stable polyaryletherketoneketone can have an ultraviolet (UV) absorbance at 455 nm, when measured in 0.1% solution in dichloroacetic acid, of less than 0.185, e.g., preferably less than 0.18, 0.17, 0.16, 0.15, 0.14, or lower. The following examples further illustrate aspects of the processes of the present disclosure.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Example 1

An reactive polyaryletherketoneketone polymer (50 kg) is produced from diphenylether and a mixture of terephthaloyl chloride (T) and isophthaloyl chloride (I), with a T/I ratio of 75:25, in the presence of aluminum chloride in a chlorinated solvent with a reaction temperature of −15 to 30° C. After isolation and purification, the resulting polymer has an inherent viscosity of 0.67 dL/g, measured in 0.5% solution in concentrated sulfuric acid at 30° C., and an UV absorbance of 0.481 at 455 nm, measured in 0.1% solution in dichloroacetic acid. The UV spectra of this polyaryletherketoneketone is illustrated in FIG. 1. The polymer is dried at 150° C. overnight. The polymer is dried at 150° C. overnight.

Figure 2:
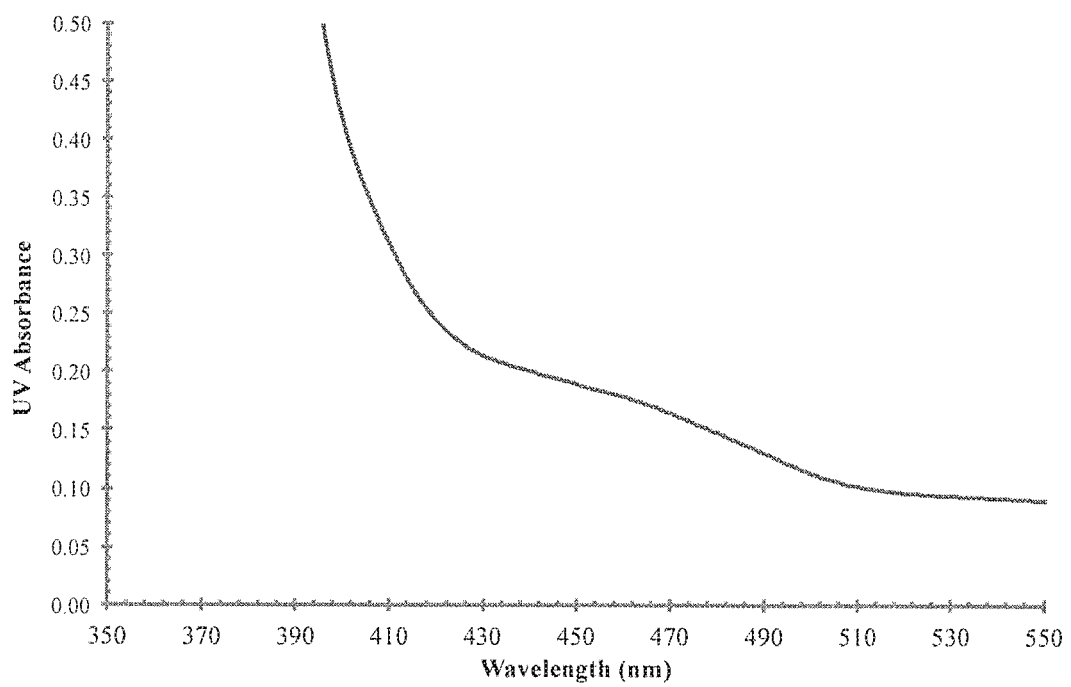
FIG. 2 is a UV Spectrum of a melt stable polyaryletherketoneketone in 0.1% solution in dichloroacetic acid prepared from the reactive polyaryletherketoneketone of Example 1.

The dried polymer is then continuously fed into a 26 mm WP twin screw extruder, preset at a cylinder temperature of 380° C. at a feed rate of 10 kg/hr, to perform melt reactive extrusion. The polymer was extruded from the WP twin screw extruder in pelletized form. The pelletized polymer is fully soluble in concentrated sulfuric acid, and has an average inherently viscosity of 1.17 dL/g, measured in 0.5% solution in concentrated sulfuric acid at 30° C., and an UV absorbance of 0.184 at 455 nm, measured in 0.1% solution in dichloroacetic acid. The UV spectra of this polyaryletherketoneketone is illustrated in FIG. 2. After reactive extrusion, the inherent viscosity of the resulting polymer is approximately 75% higher than the initial polymer.

Example 2

Figure 3:
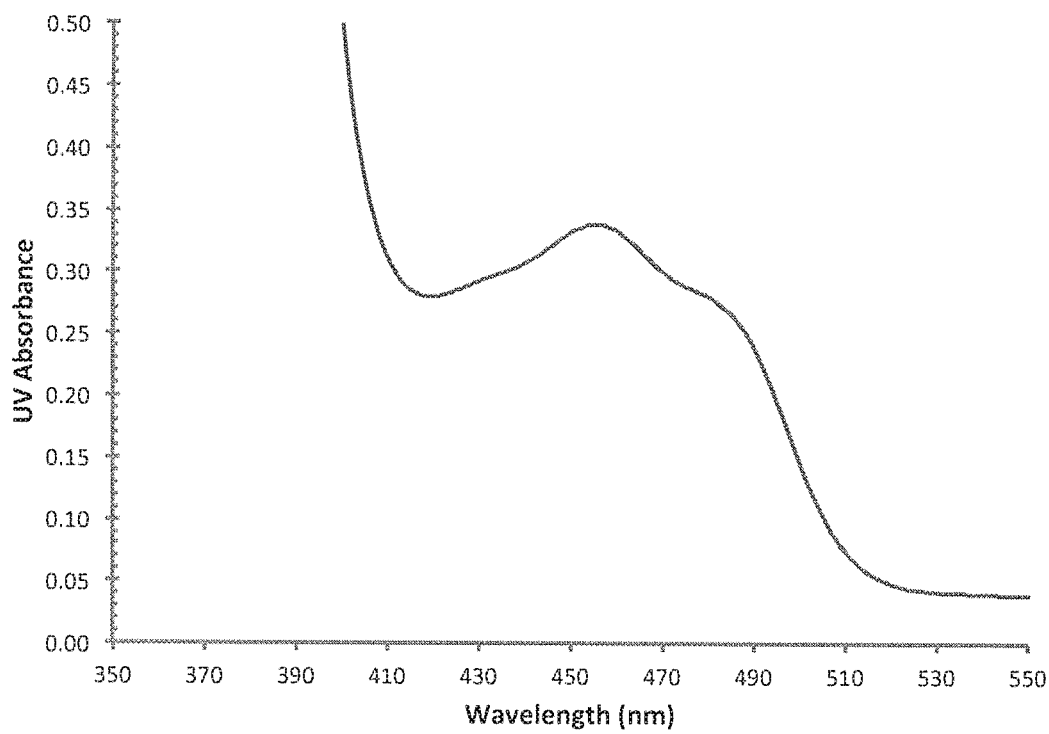
FIG. 3 is a UV Spectrum of reactive polyaryletherketoneketone of Example 2 in 0.1% solution in dichloroacetic acid.

An reactive polyaryletherketoneketone polymer (50 kg) is produced from diphenylether and a mixture of terephthaloyl chloride (T) and isophthaloyl chloride (I), with a T/I ratio of 75:25, in presence of aluminum chloride in a chlorinated solvent with a reaction temperature of −15° C. to 30° C. After isolation and purification, the resulting polymer has an inherent viscosity of 0.78 dL/g, measured in 0.5% solution in concentrated sulfuric acid at 30° C., and an UV absorbance of 0.338 at 455 nm, measured in 0.1% solution in dichloroacetic acid. The UV spectra of this polyaryletherketoneketone is illustrated in FIG. 3. The polymer is dried at 150° C. overnight.

The dried polymer is then continuously fed into a 26 mm WP twin screw extruder, preset at a cylinder temperature of 380° C. at a feed rate of 10 kg/hr, to perform melt reactive extrusion. The pelletized polymer is fully soluble in concentrated sulfuric acid, and has an inherently viscosity of 1.05 dL/g, measured in 0.5% solution in concentrated sulfuric acid at 30° C., and an UV absorbance of 0.138 at 455 nm, measured in 0.1% solution in dichloroacetic acid. After reactive extrusion, the inherent viscosity of the resulting polymer is about 35% higher than the initial polymer.

Example 3

A polyaryletherketoneketone polymer (50 kg) is produced from diphenylether and a mixture of terephthaloyl chloride (T) and isophthaloyl chloride (I), with a T/I ratio of 75:25, in presence of aluminum chloride in a chlorinated solvent with a reaction temperature of −15 to 30° C. After isolation and purification, the polymer is treated with formic acid solution (85%) at 95° C. for 30 minutes. The resulting polymer has an inherent viscosity of 0.81 dL/g, measured in 0.5% solution in concentrated sulfuric acid at 30° C., and an UV absorbance of 0.233 at 455 nm, measured in 0.1% solution in dichloroacetic acid. The polymer is dried at 150° C. overnight.

The dried polymer is continuously fed into a 26 mm WP twin screw extruder, preset at a cylinder temperature of 380° C. at a feed rate of 10 kg/hr, to perform melt reactive extrusion. The pelletized polymer is fully soluble in concentrated sulfuric acid, and has an inherently viscosity of 1.00 dL/g, measured in 0.5% solution in concentrated sulfuric acid at 30° C. With reactive extrusion, the inherent viscosity of the resulting polymer is approximately 23% higher than the original polymer.

Example 4

The reactive extruded polyaryletherketoneketone polymer pellet from Example 2, is dried at 150° C. overnight. The polymer is continuously fed into a 26 mm WP twin screw extruder, preset at a cylinder temperature of 380° C. at a feed rate of 10 kg/hr, to perform melt reactive extrusion. The resulting polymer is fully soluble in concentrated sulfuric acid, and has an inherent viscosity of 1.01 dL/g, measured in 0.5% solution in concentrated sulfuric acid at 30° C. After a second iteration of extrusion, there is no measurable change of the resulting polymer's inherent viscosity when it is compared with iteration of reactive extrusion of Example 2.

Example 5

The reactive extruded polyaryletherketoneketone polymer pellet from Example 4, is dried at 150° C. overnight. The polymer is continuously fed into a 26 mm WP twin screw extruder, preset at a cylinder temperature of 380° C. at a feed rate of 10 kg/hr, to perform melt reactive extrusion. The resulting polymer is fully soluble in concentrated sulfuric acid, and has an inherent viscosity of 1.08 dL/g, measured in 0.5% solution in concentrated sulfuric acid at 30° C. After a third round of reactive extrusion, there is no measurable change of the resulting polymer's inherent viscosity when it is compared with first round of reactive extrusion of Example 2.

Figure 4:
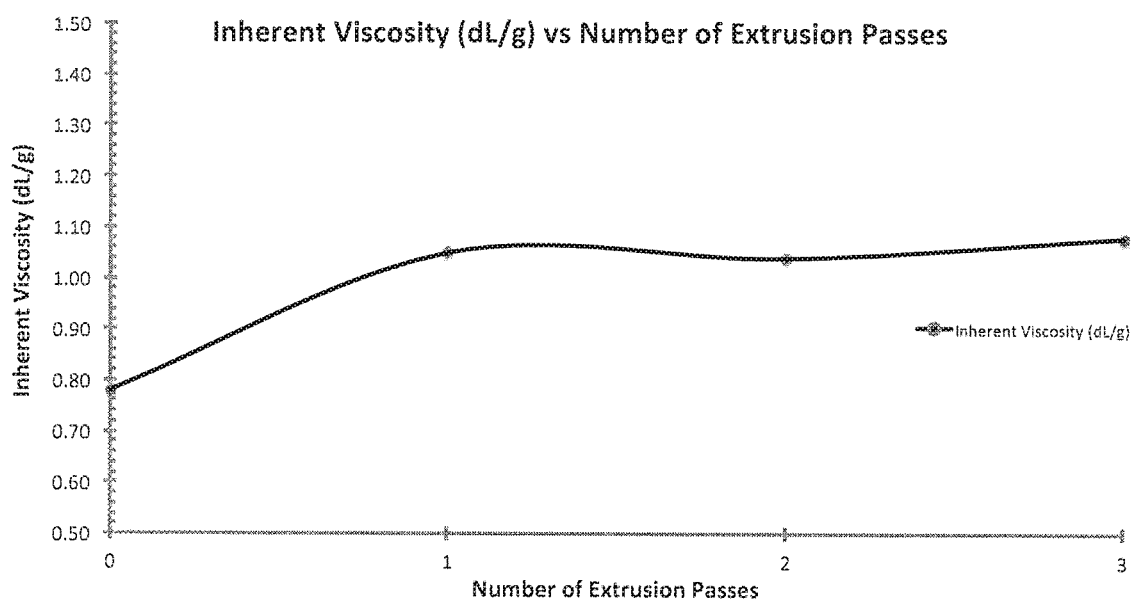
FIG. 4 is a plot of inherent viscosity change vs number of extrusion runs for polyaryletherketoneketone in Example 2, with an initial viscosity of 0.78 dL/g, and UV absorbance of 0.338 at 455 nm.

The change of inherent viscosity of polyaryletherketoneketone in Example 2 vs the number of extrusion passes are illustrated in FIG. 4. FIG. 4 and Examples 4 and 5 show that a polyaryletherketoneketone polymer prepared by reactive extrusion with a reactive polyaryletherketoneketone polymer having a large amount of 9-phenylenexanthydrol functional groups, as measured by UV absorbance, is melt stable. FIG. 4 further indirectly shows that the processed melt stable polyaryletherketoneketone prepared from the reactive, initial polymer does not have sufficient, if any, 9-phenylenexanthydrol functional groups since the molecular weight does not change significantly with additional melt extrusion iterations and the processed polyaryletherketoneketone remains soluble, thus exhibiting a lack of crosslinking.

Comparable Example A

A polyaryletherketoneketone polymer (50 kg) is produced from diphenylether and a mixture of terephthaloyl chloride (T) and isophthaloyl chloride (I), with a T/I ratio of 75:25, in presence of aluminum chloride in a chlorinated solvent with a reaction temperature of −15 to 30° C. After isolation and purification, the polymer is treated with formic acid solution (85%) at 95° C. for 3 hours. The resulting polymer has an inherent viscosity of 0.71 dL/g, measured in 0.5% solution in concentrated sulfuric acid at 30° C., and an UV absorbance of 0.185 at 455 nm, measured in 0.1% solution in dichloroacetic acid. The polymer is dried at 150° C. overnight.

The polymer is continuously fed into a 26 mm WP twin screw extruder, preset at a cylinder temperature of 380° C. at a feed rate of 10 kg/hr, to perform melt extrusion. The pelletized polymer is fully soluble in concentrated sulfuric acid, and has an inherently viscosity of 0.74 dL/g, measured in 0.5% solution in concentrated sulfuric acid at 30° C. The initial polyaryletherketoneketone used for this Comparative Example A and processed with an extruder has not had a significant change in viscosity compared with the original polymer prior to melt extrusion.

Comparable Example B

Figure 5:
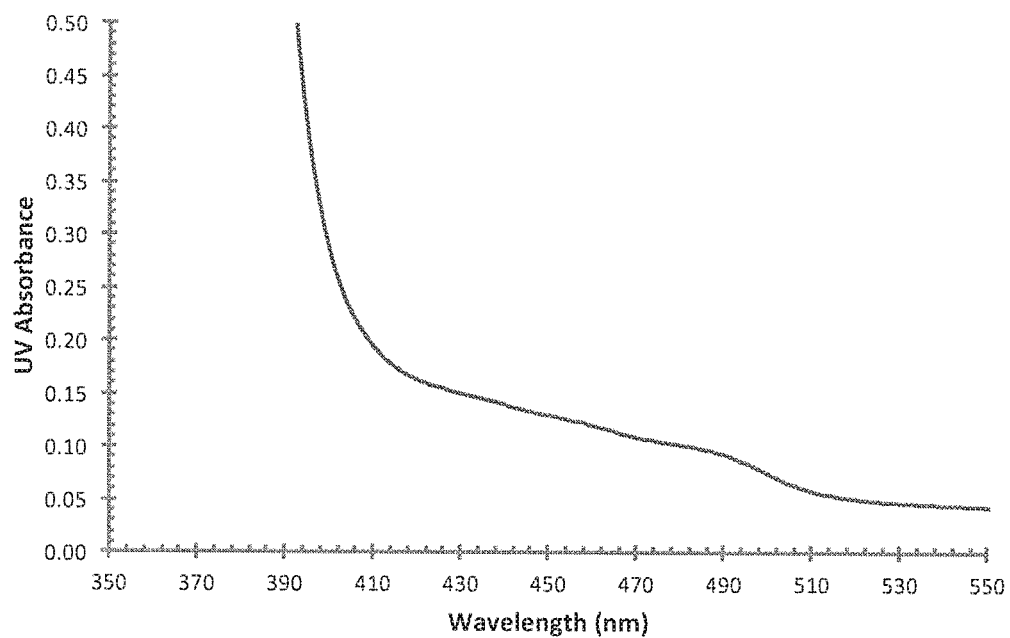
FIG. 5 is a UV spectrum of initial polyaryletherketoneketone of Comparable Example B, in 0.1% solution in dichloroacetic acid.

A polyaryletherketoneketone polymer (50 kg) is produced from diphenylether and a mixture of terephthaloyl chloride (T) and isophthaloyl chloride (I), with a T/I ratio of 75:25, in presence of aluminum chloride in a chlorinated solvent with a reaction temperature of −15 to 30° C. After isolation and purification, the polymer is treated with anhydrous formic acid at 100° C. for 4 hours. The resulting polymer has an inherent viscosity of 0.76 dL/g, measured in 0.5% solution in concentrated sulfuric acid at 30° C., and an UV absorbance of 0.169 at 455 nm, measured in 0.1% solution in dichloroacetic acid. The UV spectra of this polyaryletherketoneketone is illustrated in FIG. 5. The polymer is dried at 150° C. overnight.

The dried polymer is then continuously fed into a 26 mm WP twin screw extruder, preset at a cylinder temperature of 380° C. at a feed rate of 10 kg/hr, to perform melt extrusion. The pelletized polymer is fully soluble in concentrated sulfuric acid, and has an inherently viscosity of 0.77 dL/g, measured in 0.5% solution in concentrated sulfuric acid at 30° C., which viscosity is not significantly different compared with the initial polymer prior to melt extrusion.

Comparable Example B-1

The reactive extruded polyaryletherketoneketone polymer pellet from Comparable Example B, is dried at 150° C. overnight. The polymer is continuously fed into a 26 mm WP twin screw extruder, preset at a cylinder temperature of 380° C. at a feed rate of 10 kg/hr, to perform melt reactive extrusion.

The resulting polymer is fully soluble in concentrated sulfuric acid, and has an inherent viscosity of 0.75 dL/g, measured in 0.5% solution in concentrated sulfuric acid at 30° C. After a second round of reactive extrusion, there is no measurable change of the resulting polymer's inherent viscosity when it is compared with the original polymer prior to melt extrusion in Comparable Example B.

Comparable Example B-2

The extruded polyaryletherketoneketone polymer pellet from Comparable Example B-1, is dried at 150° C. overnight. The polymer is continuously fed into a 26 mm WP twin screw extruder, preset at a cylinder temperature of 380° C. at a feed rate of 10 kg/hr, to perform melt extrusion.

The resulting polymer is fully soluble in concentrated sulfuric acid, and has an inherent viscosity of 0.75 dL/g, measured in 0.5% solution in concentrated sulfuric acid at 30° C. After a third round of reactive extrusion, there is no measurable change of the resulting polymer's inherent viscosity when it is compared with the initial polymer prior to melt extrusion in Comparable Example B.

Figure 6:
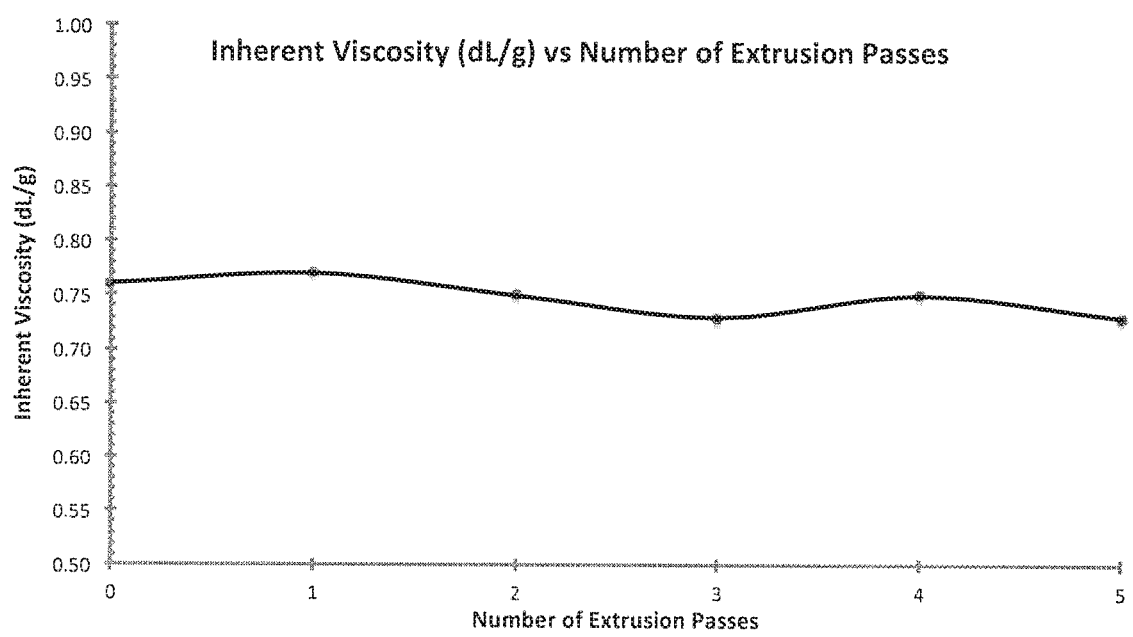
FIG. 6 is a plot of inherent viscosity change vs number of extrusion runs for polyaryletherketoneketone in Comparable Example B, with an initial viscosity of 0.76 dL/g, and UV absorbance of 0.169 at 455 nm.

The change of inherent viscosity of polyaryletherketoneketone in Comparable Example B vs number of extrusion passes are illustrated in FIG. 6.

The comparative examples show that a polyaryletherketoneketone having a measured UV absorbance of 0.185 or less does not undergo an increase in inherent viscosity with the extrusion process.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A process for preparing a melt stable polyaryletherketoneketone, comprising steps of:
preparing a reactive polyaryletherketoneketone having an inherent viscosity of at least 0.35 dL/g, as measured in 0.5% solution in concentrated sulfuric acid at 30° C., and having an UV absorbance at 455 nm of greater than 0.185 and less than 0.600, measured in 0.1% solution in dichloroacetic acid, and having 9-phenylenexanthydrol functional groups; and
heating the reactive polyaryletherketoneketone to increase a molecular weight thereof and to form the melt stable polyaryletherketoneketone;
wherein the melt stable polyaryletherketoneketone has an inherent viscosity that is at least 10% greater than the inherent viscosity of the reactive polyaryletherketoneketone prepared therefrom as measured in 0.5% solution in concentrated sulfuric acid at 30° C.

2. The process of claim 1, comprising heating the reactive polyaryletherketoneketone by melt extruding the reactive polyaryletherketoneketone.

3. The process of claim 1, wherein the inherent viscosity of the melt stable polyaryletherketoneketone is at least 30% greater than the reactive polyaryletherketoneketone.

4. The process of claim 1, wherein the reactive polyaryletherketoneketone is prepared from a mixture of a diphenylether, a terephthaloyl halide and a isophthaloyl halide and a catalysts.

5. The process of claim 4, wherein the catalysts comprises an aluminum salt.

6. The process of claim 4, wherein a ratio of terephthaloyl halide and isophthaloyl halide is from 90/10 to 10/90.

7. The process of claim 1, wherein the melt stable polyaryletherketoneketone has an inherent viscosity at least 0.90 dL/g, measured in 0.5% solution in concentrated sulfuric acid at 30° C.

* * * * *